3,793,236
OXAZOLIDONE-MODIFIED ISOCYANURATE RESINS
Kaneyoshi Ashida, Tokyo, Japan, and Kurt C. Frisch, Grosse Ile, Mich.; said Ashida assignor to Mitsubishi Chemical Industries Limited, Tokyo, Japan
No Drawing. Filed Feb. 12, 1971, Ser. No. 115,061
Int. Cl. C08g 22/34, 22/44
U.S. Cl. 260—2.5 AW                26 Claims

ABSTRACT OF THE DISCLOSURE

Resins having a polyisocyanurate structure are produced by trimerizing an isocyanate-terminated polyoxazolidone by means of a trimerization catalyst such as a tertiary amine. Foamed resins of the foregoing type exhibit unexpectedly low friability and high flame resistivity, and thus are useful as building materials and for other applications requiring a combination of high heat and flame resistance. These resins are also useful as coatings, adhesives, elastomers, and the like.

BACKGROUND OF THE INVENTION

The trimerization reaction of isocyanates to yield isocyanurate rings, has been known for over a hundred years. The isocyanurate ring is characterized by high thermal and hydrolytic stability. In recent years, the preparation of rigid foams containing isocyanurate rings has been described by a number of investigators. Because of the high crosslink density of isocyanurate foams, efforts have been made to reduce the inherent friability of these foams by modification with other groups. Burkus in U.S. Pats. 2,979,485 and 2,993,870 and Nichols and Gmitter, J. Cellular Plastics 1, 85 (1965) reported the preparation of isocyanurate-containing urethane foams by trimerization of isocyanate-terminated prepolymers.

Urethane-modified isocyanurate foams, prepared by the one-shot method have been described by Bernard et al. in Belgian Pat. 712,731 and Ball et al. in J. Cellular Plastics 4, 248 (1968). Urethane and polyamide modified isocyanurate foams, prepared by the one-shot method have been reported by Ashida et al. in British Pat. 1,155,768. The latter described the preparation of these foams employing polymeric isocyanates, polyester or polyether polyols, carboxyl-terminated polyesters or polymerized fatty acids, using different trimerization catalysts including tertiary amines and alkali metal carboxylates.

Carbodiimide-containing isocyanurate foams have been disclosed in Belgian Pat. 723,151.

Very recently, the preparation of one-shot, high temperature resistant, rigid foams, having low flame spread ratings, was described by Hayash et al., in Canadian Pat. 833,619. These foams containing oxadolidone linkages were prepared by reaction of polymeric isocyanates with monomeric polyepoxides using triethylene-diamine as a catalyst. While such epoxy-modified isocyanurate foams do have enhanced flame resistivity, no remarkable improvement in friability can be obtained.

While the preparation of polyoxazolidones by the reaction of isocyanates with polyepoxides is broadly disclosed in U.S. Pat. 3,313,747 to Schramm, such compounds have not been heretofore polymerized to a polyisocyanurate structure. However, when such polymerization was carried out in accordance with the present invention, the polyisocyanurate foams obtained exhibited unexpectedly low friability as well as high flame resistivity.

It is an object of this invention to provide a polyisocyanurate resin having improved physical properties.

It is a further object of this invention to provide polyisocyanurate foams having low friability and high flame resistivity.

It is still another object of this invention to provide a foamed resin having a relatively high isotropicity.

Another object is to provide highly temperature-resistant and highly flame-resistant materials.

Still other objects will readily present themselves to one skilled in the art upon reference to the ensuing specification and claims.

SUMMARY OF THE INVENTION

The present invention contemplates trimerizable compositions for producing polyisocyanurates which contain an isocyanate-terminated polyoxazolidone and a catalytically effective amount of a trimerization catalyst such as a tertiary amine having no active hydrogen atoms or the like. Blowing agents and surfactants can be incorporated into the formulations if it is desired to produce a polyisocyanurate foam.

In preparing the formulations of this invention, the appropriate polyoxazolidone and the trimerization catalyst can be compounded directly or, in the alternative, an organic polyisocyanate is first reacted with a polyepoxide in an epoxy/isocyanate equivalent ratio of less than about 1, and in the presence of an oxazolidone-formation catalyst so as to produce an isocyanate-terminated polyoxazolidone which is then subsequently trimerized to a polyisocyanurate structure. Particularly suitable oxazolidone-formation catalysts for the preparation of the aforesaid polyoxazolidone prepolymers are aluminum alkoxides and Friedel Crafts catalysts. Friedel Crafts catalysts are described in the literature, e.g., Kirk-Othmer Encyclopedia of Chemical Technology, vol. 10, pp. 158–166.

The polyisocyanurate resins of this invention are useful as building or structural materials in applications which can range from foams to cast products, including adhesives, coatings, elastomers, etc.

DESCRIPTION OF THE PREFERRED EMBODIMENTS

The isocyanate-terminated polyoxazolidones can be conveniently prepared by reacting an organic polyisocyanate with polyepoxide. The reaction is usually carried out at an elevated temperature, preferably in the range from about 100° C. to about 150° C. for a time period of from about 0.5 to about 5 hours. An oxazolidone-formation catalyst such as a Friedel Crafts catalysts, i.e., $AlCl_3$, $FeCl_3$, and $ZnCl_2$, or aluminum isopropoxide is employed. Also suitable as catalysts are lithium butoxide, lithium chloride, or a quaternary ammonium halide. The catalyst can be present in a catalytically effective amount, preferably in an amount in the range from about 0.001 weight percent to about 15 weight percent, based on the weight of the reactants, and more preferably in the range from about 0.01 weight percent to about 10 weight percent.

The term "organic polyisocyanate" as used herein and in the appended claims is taken to mean an organic compound containing two or more isocyanato (—NCO) groups.

Suitable organic polyisocyanates for the purposes of the present invention are those which are commonly used in the preparation of polyurethanes. Illustrative of such polyisocyanates are the tolylene diisocyanates (TDI) such as 2,4-tolylene diisocyanate, 2,6-tolylene diisocyanate, methylene bis(phenyl isocyanates) (MDI) such as 4,4'-methylene bis(phenyl isocyanate), also dianisidine diisocyanate, toluidine diisocyanate, hexamethylene diisocyanate, m-xylene diisocyanate, 1,5-naphthalene diisocyanate, p-phenylene diisocyanate, 1,4-diethylbenzene-$\beta,\beta'$-diisocyanate and other di- and higher polyisocyanates. Mixtures of two or more of the above isocyanates can also be used, such as mixtures of the 2,4- and 2,6-isomers of tolylene diisocyanate, mixtures of the 2,4'- and 4,4'-isomer of methylene bis(phenyl isocyanate) and the like. In addition to the 4,4'-methylene bis(phenyl isocyanate) or mixtures of the 2,4'-isomer and the 4,4'-isomer thereof which are employed as the isocyanate component, there can also be used modified forms of these isocyanates. For example, there can be used 4,4'-methylene bis(phenyl isocyanate), or an admixture thereof with a minor amount of the 2,4'-isomer, which has been treated to convert a minor proportion, generally less than 15% by weight of the starting material, to an artifact of said starting material. For example, the polyisocyanate component can be methylene bis(phenyl isocyanate) which has been converted to a stable liquid at temperatures of about 10° C. and higher.

Illustrative of another modified form of 4,4'-methylene bis(phenyl isocyanate) which can form the polyisocyanate component is the product obtained by treating the former compound, or mixtures thereof with small portions of 2,4'-isomer, with a minor portion of a carbodiimide such as diphenylcarbodiimide.

In addition to the various modified forms of methylene bis(phenyl isocyanate) exemplified above there can also be employed as the polyisocyanate component a mixture of methylene bis(phenyl isocyanate) with polymethylene polyphenyl isocyanates of higher functionality. Such mixtures are generally those obtained by phosgenation of corresponding mixtures of methylene bridged polyphenyl polyamines. The latter, in turn, are obtained by interaction of formaldehyde, hydrochloric acid and primary aromatic amines, for example, aniline, o-chloroaniline, o-toluidine and the like.

Particularly suitable and thus preferred are organic isocyanates obtained by the phosgenation of the reaction products of aniline and formaldehyde, represented by the formula

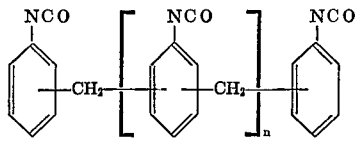

wherein *n* is an integer having a value in the range from zero to about 10, inclusive.

The polyepoxides suitable for the purposes of the present invention are virtually all polyepoxides which contain aromatic, aliphatic or cycloaliphatic groups together with two or more epoxide

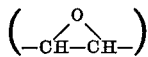

groups. Preferably the polyepoxide is aromatic-based, i.e., it contains aromatic groups. Illustrative polyepoxides are:

(1) The glycidyl ethers of polyhydric mononuclear and fused ring phenols such as resorcinol, hydroquinone, pyrocatechol, saligenin, phloroglucinol, 1,5-dihydroxynaphthalene, 1,6-dihydroxynaphthalene, 1,7-dihydroxynaphthalene and the like;

(2) The glycidyl ethers of non-fused polynuclear phenols represented by the general formula:

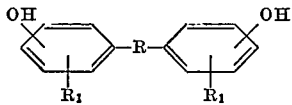

wherein $R_1$ represents 0 to 4 substituents selected from the class consisting of a halogen and lower-alkyl, A is a bridging group selected from the class consisting of

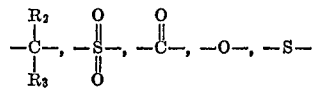

and a single covalent bond, wherein $R_2$ and $R_3$ each represent a moiety selected from the class consisting of hydrogen, lower-alkyl, lower-cycloalkyl and aryl. Typical of such compounds are the bis(glycidyl ethers) of:

4,4'-dihydroxydiphenylsulfone,
4,4'-dihydroxybiphenyl,
4,4'-dihydroxybenzophenone,
di(4-hydroxyphenyl)methane (bisphenol F),
2,2-di(4-hydroxyphenyl)butane (bisphenol B),
2,2-di(4-hydroxyphenyl)propane (bisphenol A),
1,1-di(4-hydroxyphenyl)propane,
3,3-di(3-hydroxyphenyl)pentane,
2-(3-hydroxyphenyl)-2-(4-hydroxyphenyl)butane,
1-phenyl-1-(2-hydroxyphenyl)-1-(3-hydroxyphenyl)propane,
1-phenyl-1,1-di(4-hydroxyphenyl)butane,
1-phenyl-1,1-di(4-hydroxyphenyl)pentane,
1-tolyl-1,1-di(4-hydroxyphenyl)ethane,
bis(3-bromo-4-hydroxyphenyl)methane,
2,2-bis(3-bromo-4-hydroxyphenyl)propane,
bis(3-bromo-4-hydroxyphenyl)diphenylmethane,
1,1-bis(3-bromo-4-hydroxyphenyl)-1-(2,5-dibromophenyl)ethane,
2,2-bis(3-bromo-4-hydroxyphenyl)propionitrile,
bis(3,5-dibromo-4-hydroxyphenyl)methane,
2,2-bis(3,5-dibromo-4-hydroxyphenyl)propane,
bis(3,5-dibromo-4-hydroxyphenyl)diphenylmethane,
1,1-bis(3,5-dibromo-4-hydroxyphenyl)-1-(2,5-dibromophenyl)ethane,
bis(3-bromo-4-hydroxyphenyl)sulfone,
bis(3,5-dibromo-4-hydroxyphenyl)sulfone;

(3) The glycidyl ethers of novolak resins. The novolak resins are the products obtained by acid condensation of phenol, or a substituted phenol, with formaldehyde and are conventionally represented by the general formula:

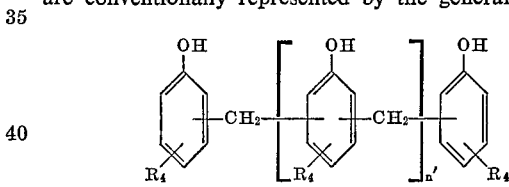

wherein $n'$ has an average value of from about 8 to 12 and $R_4$ represents from 0 to 4 substituents selected from halogen and lower alkyl groups. It is to be understood that the above formula is highly idealized and is an approximation only. A wide range of novolak resins of differing molecular weights is available commercially, all of which are represented approximately by the above formula. Since the class of novolak resins is so well recognized in the art, the epoxides derived therefrom by conversion of the novolaks to their glycidyl ethers (by conventional procedures, e.g., reaction with epichlorohydrin) will be referred to hereafter as "novolak resin glycidyl ethers";

(4) Dicyclopentadiene dioxide, i.e., the compound having the formula:

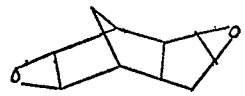

(5) Vinyl cyclohexene dioxide, i.e., the compound having the formula:

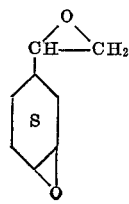

(6) The dicyclohexyl oxide carboxylates represented by the general formula:

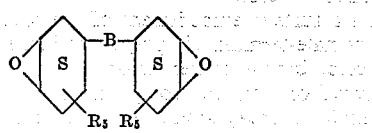

wherein $R_5$ in each instance represents from 0 to 9 loweralkyl groups, and B represents a divalent radical selected from the class consisting of:

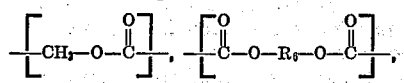

and

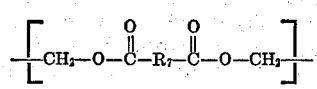

wherein $R_6$ is selected from the class consisting of loweralkylene and lower-oxyalkylene and $R_7$ is selected from the class consisting of lower-alkylene and arylene. Examples of the dicyclohexyl oxide carboxylates are:

3,4-epoxycyclohexylmethyl 3,4-epoxycyclohexanecarboxylate,
3,4-epoxy-6-methylcyclohexylmethyl 3,4-epoxy-6-methylcyclohexylcarboxylate,
bis(3,4-epoxycyclohexylmethyl)maleate,
bis(3,4-epoxycyclohexylmethyl)succinate,
ethylene glycol bis(3,4-epoxy-6-methylcyclohexanecarboxylate) and the like.

(7) The glycidyl derivatives of aromatic primary amines represented by the formula:

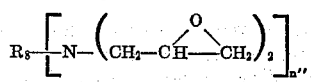

wherein $n''$ is an integer of from 1 to 3 and $R_8$ is an aromatic residue of valency $n''$ selected from the class consisting of aromatic residues having the formulae:

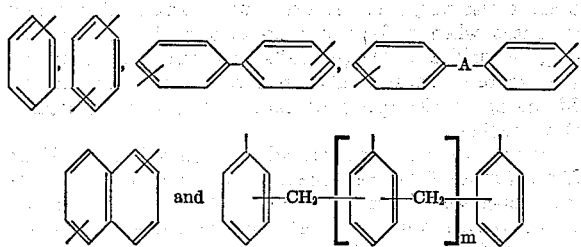

wherein A is a bridging group as hereinbefore defined and $m$ is a number having an average value of from about 0.1 to about 1.0. Illustrative of such compounds are the N,N-diglycidyl derivatives of:

aniline,
2,4-tolylene diamine,
2,6-tolylene diamine,
m-phenylene diamine,
p-phenylene diamine,
4,4'-diamino-diphenyl methane,
2,2-di(4-aminophenyl)propane,
2,2-di(4-aminophenyl)butane,
4,4'-diamino-diphenyl sulfide,
4,4'-diamino-diphenyl sulfone,
4,4'-diamino-diphenyl ether,
1,5-diamino-naphthalene, and
methylene-bridged polyphenyl polyamines from about 35 percent by weight to about 85 percent by weight of methylenediainlines, the remaining parts of said mixture being triamines and polyamines of higher molecular weight, said polyamine mixture having been formed by acid condensation of aniline and formaldehyde. The latter polyamine mixtures can be prepared by procedures well-known in the art.

The relative amounts of the organic polyisocyanate and the polyepoxide that can be present are dictated by the requirement that the epoxy/isocyanate equivalent ratio be less than about 1, for foams preferably in the range from about 0.5 to about 0.2. For coatings, the preferred equivalent ratio is in the range from about 0.7 to about 0.1. Moreover, while the polyepoxide content of the reactant mixture can be as low as about 1 percent by weight, or lower, for a friability of less than about 30 percent in the ultimately produced polyisocyanurate foam, it is preferred that the polyepoxide content of the prepolymer reactant mixture be at least about 5 percent by weight.

While the formation of the oxazolidone linkage can be achieved only in the presence of a catalyst which can be a Friedel Crafts catalyst, a tertaalkyl ammonium halide, an alkali metal halide, or the like, the catalyst may already be present in the organic polyisocyanate starting material in sufficient amounts and further addition of a catalyst may not be necessary. For example, crude TDI and crude MDI contain about 0.005 to 0.01 weight percent of ferric chloride which amount is sufficient to bring about the formation of the oxazolidone linkage at an elevated temperature.

The obtained isocyanate-terminated polyoxazolidone is then trimerized to produce the desired resin having a polyisocyanurate structure. To effect the desired trimerization the preferred trimerization catalysts are those which will cause gelation of the polyoxazolidone prepolymer to form an isocyanurate at a temperature of 20° C. in 10 minutes when present in an amount of 1 to 10 grams of the catalyst per 100 grams of the prepolymer. The catalytically effective amount to bring about the desired trimerization will vary depending on the type of catalyst utilized, the particular prepolymer that is present, the reaction conditions, etc. Generally the amount of catalyst, based on the weight of prepolymer present, is in the range of from about 0.01 percent to about 20 percent, and preferably from about 0.1 percent to about 10 percent. For the manufacture of coatings or adhesives the catalyst more preferably is present in an amount near the lower end of said preferred range and for the manufacture of foams the catalyst is present in an amount near the upper end of said preferred range.

Particularly preferred trimerization catalysts are tertiary amine catalysts such as the dialkylaminoalkyl-substituted phenols such as 2,4,6-tris(dimethylaminomethyl) phenol, 2,4,6-tris(dimethylaminoethyl)phenol, 2,4,6 - tris-(diethylaminoethyl)phenol, mixtures of ortho- and paradimethylaminoethylphenols, and 1:1 mixture of 2,4,6-tris-(dimethylaminoethyl)phenol and diglycidyl ether of bisphenol A, and N,N',N'''-tris-(dimethylaminopropyl)-sym-hexahydrotriazine.

Other suitable trimerization catalysts of the tertiary amine type are: N,N-dialkylpiperazines such as N,N-dimethylpiperazine, N,N-diethylpiperazine and the like; trialkylamines such as trimethylamine, triethylamine, tributylamine and the like; 1,4-diazabicyclo [2.2.2] octane, which is more frequently referred to as triethylene diamine, and the lower-alkyl derivatives thereof such as 2-methyl triethylene diamine, 2,3-dimethyl triethylene diamine, 2,5-diethyl triethylene diamine and 2,6-diisopropyl triethylene diamine, N,N',N''-trialkylaminoalkylhexahydrotriazines such as N,N',N''-tris(dimethylaminomethyl) hexahydrotriazine, N,N',N'' - tris(dimethylaminoethyl) hexahydrotriazine, N',N',N''-tris(diethylaminoethyl)hexahydrotriazine; N,N',N''-tris(diethylaminopropyl)hexahydrotriazine and the like; mono-, di-, and tri-(dialkylaminoalkyl) monohydric phenols or thiophenols such as 2-(dimethylaminomethyl)phenol, 2 - (dimethylaminobutyl)-phenols, 2-(diethylaminoethyl)phenol, 2-(diethylaminobutyl)phenol, 2 - (di-methylaminomethyl)thiophenol, 2-(diethylaminoethyl)thiophenol, 2,4 - bis(dimethylaminoethyl)phenol, 2,4-bis(diethylaminobutyl)phenol, 2,4-bis (dipropylaminoethyl)phenol, 2,4 - bis(dimethylaminoethyl)thiophenol, 2,4-bis(diethylaminopropyl)thiophenol, 2,4 - bis(dipropylaminoethyl)thiophenol, 2,4,6 - tris(dimethylaminobutyl)phenol, 2,4,6-tris(dipropylaminomethyl)phenol, 2,4,6-tris(diethylaminoethyl)thiophenol, 2,4,6-tris(dimethylaminoethyl)thiophenol, and the like; N,N, N',N'-tetraalkylalkylenediamines such as N,N,N',N'-tetramethyl-1,3-propane diamine, N,N,N',N'-tetramethyl-1,3-butanediamine, N,N,N',N' - tetramethylethylenediamine and the like; N,N-dialkylcyclohexylamines, such as N,N-dimethylcyclohexylamine, N,N - diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N',N'-tetraalkylguanidines, such as N,N,N',N'-tetramethylguanidine, N,N,N',N'-tetraethylguanidine and the like.

Still other trimerization catalysts are described in detail in British Pat. 1,155,768.

When it is desired to prepare polyisocyanurate foams, any suitable blowing agent may be employed, such as inorganic blowing agents, e.g., water or boric acid, low-boiling hydrocarbons, e.g., pentane, hexane, heptane, pentene, heptene, benzene, etc., halogenated hydrocarbons such as dichlorodifluoromethane, trichlorotrifluoroethane, trichlorofluoromethane, and the like. Also suitable are reactive organic blowing agents such as the nitroalkanes, e.g., nitromethane, nitroethane, nitropropane, etc., the aldoximes, e.g., acetaldoxime, propionaldoxime, etc., acid amides, e.g., formamide, acetamide, benzamide, etc., enolizable carbonyl compounds, e.g., acetylacetone, acetacetic acid ester, etc., and nitrourea.

Optionally, a surfactant such as a silicone surfactant or a non-ionic surfactant may be employed in the isocyanurate foam formulations of this invention. The use of the surfactant is not always necessary but it is preferable in instances where a relatively fine cell structure is desired. Typical examples of suitable surfactants are dimethyl-polysiloxane, siloxane-oxyalkylene block copolymers, and the like.

Other optional additives, such as flame retardants and organic or inorganic fillers usually employed in the preparation of polymer foams can also be employed in the processes of the present invention. Some of the flame retardants also tend to decrease the viscosity of the formulation during compounding. Illustrative flame retardants are tris(haloalkyl)phosphates such as tris(2-chloroethyl)phosphate, tris(2-bromoethyl)phosphate, tris(2,3-dichloroethyl)phosphate, tris(2,3 - dibromoethyl)phosphate, monoammonium phosphate, ammonium polyphosphates, sodium borate, di(2-haloalkyl)-2-haloalkanephosphonates such as di(2-chloroethyl)-2-chloroethane phosphonate, di(2-chloropropyl) 2-chloropropane phosphonate, di(2-bromopropyl) 2-bromopropane phosphonate, antimony oxides, polyvinyl chloride resins, dialkyl alkanephosphonates such as dimethyl methylphosphonate, dialkyl allylphosphonate, dimethyl benzylphosphonate, diamyl amylphosphonate, trimethyl phosphorothionate, ethylene phenyl phosphorothionate, tetrahalobisphenols such as tetrachlorobisphenol A, tetrabromobisphenol A, and the like. Said flame retardants are employed in the compositions of the invention in the appropriate amounts necessary to impart the desired degree of flame retardancy to the resulting cellular polymer.

Suitable illustrative inert inorganic fillers are calcium carbonate, ammonium phosphate, calcium phosphate, ammonium sulfate, silica, asbestos, glass, mica carbon black, wood flour, antimony oxides, etc. Illustrative organic fillers are the various polymers, copolymers, and terpolymers of vinyl chloride, vinyl acetate, acrylonitrile, acrylamide, styrene, ethylene, propylene, butadiene, divinyl benzene, and the like. Cellulose and starch can also be employed if desired.

The use of halogen-containing fillers is particularly advantageous since the use of such materials imparts additional flame resistance to the produced resins whether foamed or cast.

In a further embodiment of the present invention, the isocyanate-terminated polyoxazolidone can be further reacted, before trimerization, with a polyol, that is, a polyhydroxy organic compound having alcoholic and/or phenolic hydroxy groups, so as to obtain chain extension. The amount of polyol that can be so reacted varies, depending on the desired properties of the ultimate modified isocyanurate resin product; however, the NCO/OH equivalent ratio of the polyoxazolidone and polyol reaction mixture must be greater than 2, and preferably in the range from about 3 to about 10.

Typical aliphatic or cycloaliphatic polyhydroxy alcohols or polyhydric phenols which can be employed for this purpose are ethylene glycol, diethylene glycol, glycerol, the polypropylene glycols, butanediol, pentaerythritol, triethanolamine, inositol, sorbitol, trimethylolphenol, resorcinol, pyrogallol, hydroquinone, 1,8-naphthalene diol, 2,4,6-trimethylolphenol allyl ether, cyclohexanediol, trimethylol ethane, bis(4-hydroxyphenyl)methane, and the like.

The present invention is further illustrated by the following examples in which various polymer formulations have been compounded and the foamed or cast materials obtained therefrom tested.

TEST PROCEDURES

Flammability resistance was determined using the Butler Chimney test as reported by Krueger et al., J. Cellular Plastics 3, 497 (1967). The percent weight retention of a foamed resin specimen was determined in this test.

Fire endurance was measured using the Bureau of Mines flame penetration test as reported by Mitchell et al., Bureau of Mines Report, Invest. No. 6366 (1964). This is the relatively older version of the particular test employing a vertically rather than horizontally mounted specimen. That version was deemed preferable for the present test purposes because soot is produced in many instances when a foamed resin is burned and tends to clog the orifice of the pencil-flame burner utilized in the test, thereby occasionally producing erroneous results. Mounting of the specimen vertically greatly minimized this problem.

Smoke evolution was determined using a Rohm & Haas XP-2 Smoke Chamber. Specimens in the form of two-inch cubes were burned in the Chamber using a propane-fueled burner with the fuel pressure being maintained at about 50 p.s.i.g. and the burner flame applied at a 45° angle. Smoke density was measured by determining the decrease in light intensity of a beam of light across the chamber with respect to time.

Friability was measured in accordance with ASTM Test C-421 by placing twelve 1-inch foam cubes in an 8½" cubical container together with twenty-four ¾" solid oak cubes. The container contents were then tumbled at 60 r.p.m. for ten minutes and the weight loss of the foam cubes determined.

FOAM PREPARATION PROCEDURE

The organic polyisocyanate was admixed with the polyepoxide and optionally with an oxazolidone-formation catalyst. A reaction was permitted to take place at a temperature of from about 100° C. to about 150° C. for a time period of 2 to 5 hours. Thereafter the prepolymer-containing reaction mixture was cooled, admixed with the optional components such as a blowing agent, surfactant, filler, or the like, and a trimerization catalyst added while the reaction mixture was stirred.

The produced admixture was then poured into 5" x 4" x 9" paper containers, cured in a circulating oven for 2 hours at 80° C. and then cured for one week at room temperature. The curing conditions are not critical, however, and curing only at room temperature is also satisfactory.

TABLE I.—STARTING MATERIALS

| Designation | Composition | Average equivalent weight |
|---|---|---|
| Isonate 135 | Polymeric isocyanate (crude MDI) (NCO: 31.3%). | NCO: 133.8. |
| Epon 828 | Bisphenol A-epichlorohydrin adduct. | Epoxy: 185–192. |
| Epon 152 | Novolac-epichlorohydrin adduct. | Epoxy: 175. |
| ERL-4221 | 3,4-epoxycylohexylmethyl 3,4-epoxycyclohexane carboxylate. | Epoxy: 137. |
| ERL-4206 | Vinylcyclohexane dioxide. | Epoxy: 72. |
| L-5340 | Silicone copolymer surfactant. | |
| DMP-30 | 2,4,6-tris(dimethylaminomethyl)-phenol. | |
| Ucon 11B | Trichlorofluoromethane. | |
| Niax 3CF | Tris(2-chloroethyl) phosphate. | |
| Isonate 143L | Liquid diisocyanate structurally similar to diphenylmethane diisocyanate. | NCO: 144. |
| Takenate 500 | Xylylene diisocyanate (m./P.= 70/30). | NCO: 91.1. |
| Niax isocyanate, TDI. | Tolylene diisocyanate (80/20 of 2,4- and 2,6-isomers). | NCO: 87.0. |
| Nacconate 5050. | Modified, unrefined tolylene diisocyanate (Crude TDI). | NCO: 107. |
| Polyol A | P, Cl and Br containing polyol which is a condensation product of phosphoric acid with tetrachlorophthalic anhydride and tetrabromophthalic anhydride further reacted with propylene oxide. | OH: 192. |
| Niax A-1 | Dimethylaminoethylether. | |
| T-12 | Dibutyltindilaurate. | |
| Dabco 33 LV | Triethylene diamine. | |
| TMBDA | Tetramethylbutanediamine. | |
| T-9 | Stannous octoate. | |

Example 1

Table II, below, shows a comparison between a foam produced in accordance with the present invention (Formulation A), an isocyanurate one shot foam (Formulation B), and an epoxy-isocyanurate one shot foam which has not been prepolymerized to an isocyanate-terminated polyoxazolidone (Formulation C).

TABLE II.—COMPARISON OF VARIOUS FOAMS

| | Parts by weight of— | | |
|---|---|---|---|
| | Formulation A | Isocyanurate (one shot) Formulation B | Epoxy-isocyanurate (one shot) Formulation C |
| Epon 828 | 9.0 | 0 | 9.0 |
| Isonate 135 | 91.0 | 100 | 91.0 |
| L-5340 | 1.0 | 1.0 | 1.0 |
| Ucon 11B | 15.0 | 15.0 | 15.0 |
| DMP-30 | 7.0 | 10.0 | 10.0 |
| Cream time, seconds | 2 | 20 | 10 |
| Rise time, seconds | 40 | 135 | 120 |
| Density, lbs./cu. ft | 2.5 | 2.3 | 3.2 |
| Friability, percent wt. loss | 19 | 51.0 | 68 |

Example 2

The effect of different epoxy resins on foam properties is shown in Table III, below.

TABLE III.—ISOCYANURATE FOAMS MODIFIED WITH DIFFERENT EPOXY RESINS

| | Parts by weight | | | |
|---|---|---|---|---|
| | 1 | 2 | 3 | 4 |
| Isonate 901 | 91 | 91 | 91 | 91 |
| Epon 828 | 9 | 0 | 0 | 0 |
| Epon 152 | 0 | 9 | 0 | 0 |
| ERL-4221 | 0 | 0 | 9 | 0 |
| ERL-4206 | 0 | 0 | 0 | 9 |
| Ucon 11B | 15 | 15 | 20 | 15 |
| L-5340 | 1.0 | 1.0 | 1.0 | 1.0 |
| DMP-30 | 7.0 | 10.0 | 10.0 | 5.0 |
| Niax 3CF | 0 | 0 | 17.0 | 10.0 |
| Cream time, seconds | 2 | 2 | 2 | 5 |
| Rise time, seconds | 40 | 20 | 45 | 50 |
| Density, lb./cu. ft | 2.5 | 2.9 | 2.5 | 3.0 |
| Friability, percent wt. loss | 18.6 | 10.0 | 14.7 | 22.0 |
| Burn-through time, minutes | 120 | 48 | 27 | 32 |
| Butler chimney, percent wt. retained | 76.3 | 79.4 | 78.2 | 81.1 |
| Smoke density; | | | | |
| 50% obs | 8.4 | 12 | 12 | 14 |
| 90% obs | 18.0 | 20 | 25 | 30 |
| 100% obs | 24.6 | 26 | 37 | 41 |
| Closed cell, percent | 96.5 | | | |
| K-factor at 75° F | 0.132 | | | |

The foregoing results show that all of the modified foams of this invention exhibit a relatively low friability.

Example 3

The effect of epoxy content on foam properties is shown in Table IV, below.

TABLE IV.—EFFECT OF EPOXY CONTENT ON FOAM PROPERTIES

| | Parts by weight of— | | |
|---|---|---|---|
| | 5 | 6 | 7 |
| Prepolymer (Isonate 901/Epon 152) (wt. ratio; 10/1) | 100 | 100 | 100 |
| Additional isocyanate (Isonate 135) | 0 | 50 | 90 |
| Epoxy content, percent | 10 | 5 | 1 |
| Niax 3CF | 15 | 15 | 15 |
| L-5340 | 2.0 | 2.0 | 2.0 |
| DMP-30 | 10.0 | 10.0 | 10.0 |
| Cream time, seconds | 2 | 2 | 5 |
| Rise time, seconds | 20 | 80 | 150 |
| Density, lbs./cu. ft | 2.9 | 3.4 | 2.5 |
| Friability, percent wt. loss | 10.0 | 27.4 | 81.0 |
| Burn-through time, minutes | 48 | 85 | 24 |
| Butler chimney, percent wt. retained | 79.4 | 80.0 | 84.5 |
| Smoke density; | | | |
| 50% obs. seconds | 12 | 12 | 14 |
| 90% obs. seconds | 20 | 19 | 23 |
| 100% obs. seconds | 26 | 28 | 35 |

The above results indicate that in order to achieve a friability weight loss of less than about 30% the epoxy resin content of the foam should be at least about 5 percent by weight.

Example 4

The effect of the epoxy resin concentration in the foam formulation is also shown in Table V, as follows:

TABLE V.—EFFECT OF EPOXY/ISOCYANATE RATIO ON FOAM PROPERTIES

| Equivalent ratio | 0.09 | 0.18 | 0.27 | 0.36 | 0.45 |
|---|---|---|---|---|---|
| Prepolymer preparation; | | | | | |
| Isonate 135, grams | 401 | 334 | 268 | 268 | 268 |
| Epon 828, grams | 51 | 85 | 101 | 135 | 170 |
| Heating temp., °C | 150 | 150 | 150 | 150 | 150 |
| Heating time, hours | 1.0 | 1.0 | 1.0 | 0.5 | 0.5 |
| Processing (parts by weight); | | | | | |
| Prepolymer | 100 | 100 | 100 | 100 | 100 |
| L-5340 | 1.5 | 1.5 | 1.5 | 1.5 | 1.5 |
| Ucon-11B | 15.0 | 15.0 | 15.0 | 15.0 | 15.0 |
| DMP-30 | 5.0 | 5.0 | 5.0 | 5.0 | 5.0 |
| Cream time, seconds | 6 | 5 | 4 | 4 | 5 |
| Rise time, seconds | 128 | 135 | 155 | 156 | 155 |
| Tack free time, seconds | 65 | 70 | 80 | 75 | 70 |
| Properties; | | | | | |
| Density, lb./cu. ft | 1.83 | 1.78 | 2.24 | 1.73 | 1.96 |
| Friability, percent wt. loss | 27.8 | 28.6 | 32.6 | 32.9 | 35.6 |
| Butler chimney, percent wt. retained | 81.4 | 78.1 | 76.9 | 70.1 | 72.1 |
| Burn through time, minutes | 96 | 70 | 56 | 100 | 64 |
| Smoke density, seconds—to | | | | | |
| 50% obs | 11 | 15 | 2 | 3 | 3 |
| 90% obs | 38 | 40 | 14 | 24 | 7 |

From these data it can be seen that an equivalent ratio of less than about 0.05 is needed in order to obtain a foam having a friability weight loss of less than about 30 percent.

Example 5

The use of a flame-retardant in a foam formulation of this invention is shown in Table VI below.

TABLE VI.—PHYSICAL PROPERTIES OF AN OXAZOLIDONE ISOCYANATE FOAM CONTAINING A FLAME RETARDANT

[Prepolymer preparation; Isonate 135/Epon 828=10/1 by wt. 120° C. for 2 hours]

| | D | E | F |
|---|---|---|---|
| Processing; | | | |
| Prepolymer, grams | 500 | 500 | 500 |
| Niax 3CF, grams | 55 | 0 | 0 |
| Ucon 11B, grams | 75 | 75 | 50 |
| L-5340, grams | 5 | 5 | 5 |
| DMP-30, grams | 25 | 25 | 25 |
| Cream time, seconds | 5 | 2 | 5 |
| Rise time, seconds | 120 | 42 | 125 |
| Properties; | | | |
| Density, lbs./cu. ft | 2.3 | 2.2 | 3.0 |
| Friability, percent wt. loss | 32.5 | 24.0 | 29.9 |
| Butler chimney, percent wt. retained | 80.0 | 82.3 | 86.8 |
| Closed cell, percent corr | 96.5 | | |
| K-factor at 75° F | 0.132 | | |
| Burn-through time, minutes | 21.0 | 30.0 | 190 |
| Smoke density, seconds—to | | | |
| 50% obs | 6 | 5 | 4 |
| 90% obs | 24 | 13 | 19 |

Example 6

The physical properties of foams produced employing various oxazolidone-formation catalysts during the prepolymer preparation are shown in Tables VII and VIII, below.

TABLE VII

Oxazolidone-modified isocyanurate foam prepared by Adding LiCl to Isonate 901

Prepolymer preparation:
    LiCl: 2.0 mmole (0.084 g.)
    Isonate 901: 2.0 equiv. (266 g.)
    Epon 828: 0.3 equiv. (25.5 g.)
    Heating: 150° C. for 1 hr.

Processing:
    Prepolymer: 200 g.
    L-5340: 2.0 g.
    Ucon 11B: 30.0 g.
    DMP-30: 20.0 g.
    Cream time: 5 sec.
    Rise time: 40 sec.

Properties:
    Density: 2.2 lb./cu. ft.
    Friability: 13.2%
    Burn-through time: 61 min.
    Butler chimney, percent wt. retained: 81.4
    Smoke density, sec.:
        to 50% obs.: 4
        to 90% obs.: 16

TABLE VIII

Oxazolidone-modified isocyanurate foam prepared by adding $FeCl_3$ to Isonate 143

Prepolymer preparation:
    $FeCl_3$: 1.0 mmole (0.16 g.)
    Isonate 143L: 1.0 equiv. (144 g.)
    Epon 828: 0.17 equiv. (14.4 g.)
    Heating: 130° C. for 1 hr.

Processing:
    Prepolymer: 140 g.
    Ucon 11B: 28 g.
    Niax 3CF: 16 g.
    L-5340: 1.4 g.
    DMP-30: 7.0 g.
    Cream time: 5 sec.
    Rise time: 60 sec.

Properties:
    Density, lb./cu. ft.: 2.0
    Friability, percent wt. loss: 27.0
    Burn-through time, min.: 150
    Butler chimney, percent wt. retained: 83.0
    Smoke density, sec.:
        to 50% obs.: 4
        to 90% obs.: 13

Example 7

The effect of curing conditions on friability is shown in Table IX, below.

TABLE IX.—EFFECT OF CURING CONDITIONS ON FRIABILITY

| | Parts by weight of— | |
|---|---|---|
| | G | H |
| Composition: | | |
| Prepolymer | 400 | 400 |
| Niax 3CF | 20 | 20 |
| Ucon 11B | 60 | 60 |
| L-5340 | 8.0 | 8.0 |
| DMP-30 | 20.0 | 20.0 |
| Processing: | | |
| Cream time, seconds | 5 | 5 |
| Rise time, seconds | 60 | 60 |
| Curing conditions: | | |
| Temperature, °C | 80 | Ambient |
| Time, days | 2 | 2 |
| Properties: | | |
| Density, lb./cu. ft | 2.4 | 2.4 |
| Friability, percent wt. loss | 18.6 | 18.4 |
| Compressive strength, p.s.i.: | | |
| Parallel to foam rise | 17.8 | 17.5 |
| Perpendicular to foam rise | 18.2 | 21.3 |

From these data it can be readily seen that curing conditions do not affect the friability characteristics of the foam. In addition, the data in Table IX also show an unexpected property of the present polyoxazolidone-containing isocyanurate foams, i.e., a relatively high degree of isotropicity. The compressive strength of these foams is about the same in both the parallel and the perpendicular directions of the foam rise in the foam sample. This is quite different from the properties of conventional urethane and isocyanurate foams.

Example 8

Table X, following, provides a further comparison between the polyoxazolidone-modified isocyanurate foams of the present invention (Formulation I) on one hand and epoxy-modified isocyanurate foam (Formulation K), epoxy - urethane-modified isocyanurate foam (Formulation L), urethane-modified isocyanurate foam (Formulation M), and unmodified isocyanurate foam (Formulation N) on the other hand. All of the foams chosen for comparison were those having relatively low friability and high flame-resistance properties among foams of that particular type.

TABLE X.—A COMPARISON OF MODIFIED-ISOCYANURATE FOAMS

| | Formulation (parts by weight) | | | | |
|---|---|---|---|---|---|
| | I | K | L | M | N |
| Composition: | | | | | |
| Isonate 135/Epon 828 | 90/10 | 90/10 | | | 100/0 |
| Isonate 135/Epon 828/Pluracol 463 | | | 80/20/30 | | |
| Isonate 135/Pluracol 463 | | | | | |
| Ucon 11B | 15 | 15 | 15 | 15 | 15 |
| L-5340 | 1.0 | 1.0 | 1.0 | 1.0 | 1.0 |
| DMP-30 | 7.0 | 9.0 | 2.5 | 10.0 | 10.0 |
| Properties: | | | | | |
| Density, lbs./cu. ft | 2.5 | 2.4 | 2.3 | 2.2 | 2.3 |
| Butler Chimney, percent wt. retained | 81.2 | 84.1 | 48.3 | 57.6 | 74.5 |
| Friability, percent wt. loss | 18.6 | 44.0 | 38.7 | 23.2 | 51.0 |
| Burn-through time, minutes | 119 | 108 | 51.0 | 70.8 | 30.0 |
| Smoke density, seconds to— | | | | | |
| 50% obs | 8.4 | 17 | 15 | 6.3 | 12 |
| 90% obs | 18.0 | 42.0 | 10.2 | 12.0 | 34 |

As can be readily seen from the foregoing Table X, the polyoxazolidone-modified isocyanurate foam exhibits the lowest friability and the longest burn-through time.

EXAMPLE 9

The use of reactive blowing agents with the foam formulations of this invention is illustrated in Table XI, below. The foam formulations comprised a polyoxazolidone prepolymer containing 25.8 percent NCO (100 grams), a reactive blowing agent (0.1 equivalent), surfactant L-5340 (2.0 milliliters), catalyst DMP-30 (10 milliliters)*, and trichlorofluoromethane (5 milliliters). The experimental results are compiled in Table XI, below.

TABLE XI.—FOAMING WITH A REACTIVE BLOWING AGENT

| Blowing agent | Cream time, sec. | Rise time, sec. | Density G./ml. | Density Lbs./cu. ft. | Friability, percent |
|---|---|---|---|---|---|
| Nitroethane | 10 | 390 | 0.017 | 1.0 | 1 89 |
| Acetyl acetone | 10 | 240 | 0.033 | 2.0 | 73.4 |
| Formamide | 7 | 130 | 0.027 | 1.7 | 38.8 |
| Boric acid | 8 | 110 | 0.082 | 5.0 | 6.3 |
| Water | 5 | 135 | 1.034 | 2.1 | 8.4 |
| t-Butanol | 8 | 100 | 0.040 | 2.5 | 59.5 |

[1] High friability believed to be due to excess blowing agent and thus very low density.

Polyoxazolidone-modified isocyanurate foams having particularly good friability characteristics were obtained

* 2.5 milliliters of DMP-30 used with nitroethane and water as blowing agents.

utilizing boric acid and water as reactive inorganic blowing agents.

EXAMPLE 10

100 grams of polyoxazolidone prepolymer (Isonate 135/Epon 828 in a weight ratio of 10:1, respectively) was further reacted with 10 grams of phosphorus, bromine, and chlorine containing polyol (Polyol A). Thereafter the resulting reaction product was admixed with trichlorofluoromethane (16 grams), surfactant L-5340 (1 gram) and trimerized in the presence of DMP-30 catalyst (7.0 grams).

The foam rise time was observed to be 90 seconds, foam density was 0.025 g./cm.$^3$ (1.6 lbs./cu. ft.), friability was 23.8 percent, and the burn-through time was 45 minutes.

EXAMPLE 11

100 grams of polyoxazolidone prepolymer (Isonate 135/Epon 828 in a weight ratio of 10:1, respectively) was admixed with trichlorotrifluoroethane (19.9 grams) and surfactant L-5340 (2.0 milliliters), and then trimerized in the presence of DMP-30 catalyst (10 milliliters).

The foam cream time was observed to be 5 seconds, foam rise time was 75 seconds, density was 0.039 g./ml. (2.5 lbs./cu. ft.), and the friability was 11.6 percent.

EXAMPLE 12

Several trimerization catalysts were investigated using the following foam formulation:

|  | Grams |
| --- | --- |
| Polyoxazolidone prepolymer | 100 |
| Trichlorofluoromethane | 10 |
| L-5340 | 1.0 |
| Catalyst | Varied |

The obtained experimental data are presented in Table XII, below.

TABLE XII.—COMPARISON OF CATALYSTS

| Catalyst | Amount, ml | Density g./cm.$^3$ | Density Lbs./cu. ft. | Friability |
| --- | --- | --- | --- | --- |
| Niax A-1 | 6.0 | 0.055 | 3.4 | 66 |
| T-12 | 3.0 | 0.041 | 2.6 | 75 |
| Dabco 33LV | 3.0 | 0.066 | 4.1 | 22 |
| TMBDA | 3.0 | 0.064 | 4.0 | 100 |
| T-9 | 3.0 | 0.044 | 2.7 | 88 |

EXAMPLE 13

A coating formulation was prepared by admixing xylylene diisocyanate (80/20 mixture of p/m isomers, 94 grams, 1.0 equivalent weight) with an epoxy resin (21 grams, 0.25 equivalent weight) and reacted in the presence of zinc chloride (0.1 gram) for 50 minutes at 120° to 130° C. A viscous reaction product was obtained to which were added xylene (50 milliliters) and Cellosolve acetate (50 milliliters) so as to produce a homogeneous solution.

100 grams of the homogeneous solution was then admixed with a 50-weight percent xylene solution of 2,4,6-tris(dimethylaminomethyl)phenol (1.0 milliliter), and the resulting admixture was cast on a glass plate and placed in an oven for 3 hours at 70° C.

The obtained coating was a colorless, transparent film, exhibited good adhesion to glass, good light stability, high abrasion resistance, high temperature resistance, and high chemical and hydrolytic stability. Good flame resistance properties were also observed.

Example 14

A polyoxazolidone prepolymer produced by the reaction of Isonate 135 (10 parts by weight) and Epon 828 (1.0 part by weight) at 120° C. for 2 hours was diluted with sufficient Cellosolve acetate to make a 50-weight percent solution.

100 grams of this solution was then mixed with a 50-weight percent xylene solution of 2,4,6-tris(dimethylaminomethyl)phenol (1.0 milliliter) and the resulting admixture was cast on a glass plate and placed in an oven for 3 hours at 70° C.

The obtained coating was a yellow film exhibiting good adhesion to glass, high temperature resistance, high abrasion resistance, high scratch resistance, and high chemical and hydrolytic stability. The coating also exhibited good flame extinguishing properties.

Example 15

100 grams of polyoxazolidone prepolymer obtained by reacting 10 parts by weight crude MDI (Isonate 135) and 1.0 part by weight of epoxy resin (Epon 828) at 120° C. for 2 hours was admixed with 0.5 milliliter of 2,4,6-tris-(dimethylaminomethyl)phenol, cast in a silicone rubber mold, and heated.

A dark brown, hard resinous material was obtained. The resinous material exhibited high temperature resistance, high dimensional stability, and high chemical and hydrolytic stability.

Example 16

150 grams of polyoxazolidone prepolymer prepared in a manner similar to Example 15 was admixed with 0.5 milliliter of 2,4,6-tris(dimethylaminomethyl)phenol. An approximately 5-inch by 5-inch swatch of three-ply glass cloth was then impregnated with the resulting admixture and placed in an oven maintained at 70° C. for 4 hours.

The obtained, fiber-reinforced polyoxazolidone-modified-isocyanurate resin exhibited good impart strength, high temperature resistance, high dimensional strength, and high chemical and hydrolytic stability.

The foregoing discussion and the examples are illustrative but are not to be construed as limiting. Still other variations within the spirit and scope of this invention will readily present themselves to one skilled in the art.

What is claimed is:

1. A process for the preparation of an oxazolidone-modified polyisocyanurate foam which comprises
   (a) reacting in the presence of an oxazolidone-formation catalyst at an elevated temperature, an organic polyisocyanate with a polyepoxide in an epoxy/isocyanate equivalent ratio of less than about 1 but sufficient to produce an isocyanate-terminated polyoxazolidone, and thereafter
   (b) admixing an effective amount of a trimerization catalyst with the isocyanate-terminated polyoxazolidone from step (a), and effecting trimerization thereof in the presence of a blowing agent, thereby to form said oxazolidone-modified polyisocyanurate foam.

2. The process in accordance with claim 1 wherein the blowing agent is a halogenated hydrocarbon.

3. The process in accordance with claim 1 wherein the blowing agent is an inorganic blowing agent.

4. The process in accordance with claim 1 wherein the blowing agent is a reactive organic blowing agent.

5. The process in accordance with claim 1 wherein a flame retardant is admixed with the isocyanate-terminated polyoxazolidone prior to trimerization.

6. The process in accordance with claim 1 wherein the oxazolidone-formation catalyst is a Friedel Crafts catalyst.

7. The process in accordance with claim 1 wherein the oxazolidone-formation catalyst is zinc chloride.

8. The process in accordance with claim 1 wherein the oxazolidone-formation catalyst is aluminum isopropoxide.

9. The process is accordance with claim 1 wherein the epoxy/isocyanate equivalent ratio is from about 0.1 to about 0.7.

10. The process in accordance with claim 1 wherein the organic polyisocyanate is represented by the formula:

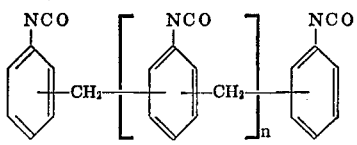

wherein n is an integer having a value in the range from zero to about 10, inclusive.

11. The process in accordance with claim 1 wherein the polyepoxide is aromatic-based.

12. The process in accordance with claim 1 wherein the trimerization catalyst is a dialkylaminoalkyl-substituted phenol.

13. The process in accordance with claim 1 wherein the trimerization catalyst is 2,4,6-tris(dimethylaminomethyl)phenol.

14. The process in accordance with claim 1 wherein the isocyanate-terminated polyoxazolidone is reacted before trimerization with a polyol in a NCO/OH equivalent ratio greater than 2.

15. The process in accordance with claim 14 wherein the polyol contains phosphorus, chlorine, and bromine.

16. An oxazolidone-modified polyisocyanurate foam prepared by
(a) reacting in the presence of an oxazolidone formation catalyst at an elevated temperature, an organic polyisocyanate with a polyepoxide in an epoxy/isocyanate equivalent ratio of less than 1 but sufficient to produce an isocyanate-terminated polyoxazolidone, and thereafter
(b) admixing an effective amount of a trimerization catalyst with the isocyanate-terminated polyoxazolidone from step (a) and effecting trimerization thereof in the presence of a blowing agent thereby to form said oxazolidone-modified polyisocyanurate foam.

17. The polyisocyanurate foam of claim 16 wherein the isocyanate-terminated polyoxazolidone is extended with a polyol prior to trimerization.

18. The polyisocyanurate foam of claim 16 wherein the blowing agent is a halogenated hydrocarbon.

19. The polyisocyanurate foam of claim 16 wherein the blowing agent is an inorganic blowing agent.

20. The polyisocyanurate foam of claim 16 wherein the blowing agent is a reactive organic blowing agent.

21. The polyisocyanurate foam of claim 16 wherein the isocyanate-terminated polyoxazolidone additionally contains a surfactant.

22. The polyisocyanurate foam of claim 16 wherein the isocyanate-terminated polyoxazolidone additionally contains a flame retardant.

23. The polyisocyanurate foam of claim 16 wherein the isocyanate-terminated polyoxazolidone additionally contains an organic filler.

24. The polyisocyanurate foam of claim 16 wherein the isocyanate-terminated polyoxazolidone additionally contains an inorganic filler.

25. The polyisocyanurate foam of claim 16 wherein the trimerization catalyst is a dialkylaminoalkyl-substituted phenol.

26. The polyisocyanurate foam of claim 16 wherein the trimerization catalyst is 2,4,6-tris(dimethylaminomethyl)phenol.

References Cited

UNITED STATES PATENTS

| | | | |
|---|---|---|---|
| 3,334,110 | 8/1967 | Schramm | 260—307 |
| 3,620,986 | 11/1971 | Diehr et al. | 260—2.5 AW |
| 3,673,128 | 6/1972 | Hayash et al. | 260—2.5 A |
| 3,073,787 | 1/1963 | Krakler | 260—2.5 |
| 3,620,987 | 11/1971 | McLaughlin et al. | 260—2.5 N |
| 3,644,232 | 2/1972 | Bernard et al. | 260—2.5 AW |
| 3,154,522 | 10/1964 | Beitchman | 260—77.5 |
| 3,294,753 | 12/1966 | Beitchman et al. | 260—77.5 |
| 3,222,303 | 12/1965 | Hampson | 260—2.5 |
| 3,580,868 | 5/1971 | Diehr et al. | 260—2.5 |
| 3,211,703 | 10/1965 | Gilman et al. | 260—77.5 |
| 3,494,888 | 2/1970 | McElroy | 260—47 |
| 3,745,133 | 7/1973 | Communale et al. | 260—2.5 AW |

DONALD E. CZAJA, Primary Examiner
H. S. COCKERAM, Assistant Examiner

U.S. Cl. X.R.
252—182; 260—77.5 R, 77.5 AC, 77.5 NC

UNITED STATES PATENT OFFICE
CERTIFICATE OF CORRECTION

FRISCH-3

Patent No. 3,793,236          Dated February 19, 1974

Inventor(s) Kurt C. Frisch, et al.

It is certified that error appears in the above-identified patent and that said Letters Patent are hereby corrected as shown below:

| PATENT READS: | APPLICATION READS: |
|---|---|
| Col. 3, line 63:<br>"-R-" (middle of formula) | Page 5, bottom:<br>--- -A- --- (middle of formula) |
| Col. 5, line 60:<br>line was omitted | Page 9, line 15:<br>---4,4'-diamino-diphenyl--- |
| Col. 5, line 70<br>"methylenediainlines" | Page 9, line 25:<br>---methylenedianilines--- |
| Col. 6, lines 50-51<br>"2,4,6-tris(dimethylamino-ethyl)phenol" | Page 11, line 7:<br>---2,4,6-tris(dimethylamino-methyl)phenol--- |
| Col. 9, line 17<br>"NCO: 91.1" | Page 16, line 16:<br>---NCO: 94.1--- |
| Col. 14, line 34:<br>"impart" | Page 30, line 11:<br>---impact--- |

Signed and sealed this 17th day of September 1974.

(SEAL)
Attest:

McCOY M. GIBSON JR.
Attesting Officer

C. MARSHALL DANN
Commissioner of Patents